United States Patent
Baker et al.

(10) Patent No.: US 10,023,702 B2
(45) Date of Patent: Jul. 17, 2018

(54) CURABLE MONOMERS

(75) Inventors: David Baker, South Gloucestershire (GB); Amir Rezai, South Gloucestershire (GB)

(73) Assignee: BAE Systems plc, London (GB)

(*) Notice: Subject to any disclaimer, the term of this patent is extended or adjusted under 35 U.S.C. 154(b) by 266 days.

(21) Appl. No.: 14/342,560

(22) PCT Filed: Aug. 21, 2012

(86) PCT No.: PCT/GB2012/052041
§ 371 (c)(1),
(2), (4) Date: Mar. 6, 2014

(87) PCT Pub. No.: WO2013/030536
PCT Pub. Date: Mar. 7, 2013

(65) Prior Publication Data
US 2014/0235759 A1    Aug. 21, 2014

(30) Foreign Application Priority Data

Sep. 2, 2011 (GB) .................... 1115168.5
Oct. 21, 2011 (GB) .................... 1118194.8

(51) Int. Cl.
*C08J 3/12* (2006.01)
*C08J 3/20* (2006.01)
(Continued)

(52) U.S. Cl.
CPC ............... *C08J 3/20* (2013.01); *B29C 70/025* (2013.01); *B29C 70/465* (2013.01); *B32B 5/24* (2013.01);
(Continued)

(58) Field of Classification Search
CPC ...... C09D 5/03–5/038; C09D 163/00–163/10; C08L 63/00–63/10;
(Continued)

(56) References Cited

U.S. PATENT DOCUMENTS 3,850,788 A    11/1974  Greig et al.
4,113,684 A *   9/1978  Petrie ............... C08G 59/184
                                                  427/195

(Continued)

FOREIGN PATENT DOCUMENTS

EP     0416474     3/1991
EP     0537005     7/1997

(Continued)

OTHER PUBLICATIONS

Ernest W. Flick, Plastics Additives-An Industrial Guide, 3d ed., vol. II(2002).*

(Continued)

*Primary Examiner* — Kregg T Brooks
(74) *Attorney, Agent, or Firm* — Maine Cernota & Rardin

(57) ABSTRACT

The invention relates to methods and a novel powdered curable monomer which may be used to manufacture bulk polymers, adhesives and coatings composite materials with high percentage weight inclusions of particulate filler materials, more specifically to fibre reinforced polymer composite materials with high percentage weight inclusions of particulate filler materials. The preferred particulate filler materials are carbon nanotubes. The method according to the invention allows greater than 0.5 wt % of carbon nanotubes, typically greater 10% wt of carbon nanotubes or other high aspect ratio fillers to be readily incorporated in the resin matrix, before being applied to the fibre reinforcing plys.

15 Claims, 1 Drawing Sheet

(51) Int. Cl.
| | |
|---|---|
| C08J 5/04 | (2006.01) |
| C08J 3/24 | (2006.01) |
| C08J 5/24 | (2006.01) |
| C08J 7/12 | (2006.01) |
| C08J 7/16 | (2006.01) |
| C08J 7/18 | (2006.01) |
| C08K 7/24 | (2006.01) |
| B29B 15/00 | (2006.01) |
| B29C 70/00 | (2006.01) |
| B29C 70/02 | (2006.01) |
| B29C 70/46 | (2006.01) |
| B32B 5/24 | (2006.01) |
| C08G 59/18 | (2006.01) |
| C08K 3/04 | (2006.01) |
| B32B 5/26 | (2006.01) |
| B29K 105/12 | (2006.01) |

(52) U.S. Cl.
CPC .......... *B32B 5/26* (2013.01); *C08J 3/12* (2013.01); *C08J 3/24* (2013.01); *C08J 5/04* (2013.01); *C08K 3/04* (2013.01); *C08K 3/041* (2017.05); *C08K 3/042* (2017.05); *C08K 7/24* (2013.01); *B29K 2105/124* (2013.01); *B32B 2255/02* (2013.01); *B32B 2255/24* (2013.01); *C08J 2363/00* (2013.01); *C08J 2367/06* (2013.01); *C08J 2375/04* (2013.01); *C08J 2379/08* (2013.01); *C08K 2201/011* (2013.01); *C08K 2201/016* (2013.01)

(58) Field of Classification Search
CPC .......... C09J 163/00–163/10; C08K 2201/003; C08K 2201/004; C08K 2201/005; C08K 2201/011; C08K 2201/016; C08K 3/04–3/046; B32B 5/24; B32B 5/26; C08J 3/12; C08J 3/24; B29C 70/025; B29C 70/465
See application file for complete search history.

(56) References Cited

U.S. PATENT DOCUMENTS

| | | | | |
|---|---|---|---|---|
| 4,921,913 | A * | 5/1990 | Pettit, Jr. ................ | C08G 59/38 525/119 |
| 4,962,137 | A * | 10/1990 | McKinney ........... | C09D 163/00 428/413 |
| 5,308,565 | A | 5/1994 | Weber et al. | |
| 6,703,070 | B1 | 3/2004 | Muthiah et al. | |
| 2004/0126553 | A1 | 7/2004 | Adzima | |
| 2008/0048364 | A1 * | 2/2008 | Armeniades ........... | B82Y 30/00 264/328.1 |
| 2009/0035570 | A1 | 2/2009 | Mao | |
| 2009/0266477 | A1 | 10/2009 | Weisenberger | |
| 2010/0130655 | A1 * | 5/2010 | Agarwal ............. | C08G 59/182 524/145 |
| 2010/0266812 | A1 | 10/2010 | Lugg | |

FOREIGN PATENT DOCUMENTS

| | | |
|---|---|---|
| EP | 1209199 | 5/2002 |
| EP | 2228406 | 9/2010 |
| GB | 540404 A | 10/1941 |
| GB | 1067611 A | 5/1967 |
| GB | 1112758 A | 5/1968 |
| GB | 1420006 | 1/1976 |
| GB | 2390605 | 1/2004 |
| WO | 9619537 A1 | 6/1996 |
| WO | 2006043019 A1 | 4/2006 |
| WO | 2007008214 A1 | 1/2007 |
| WO | 2010075006 A1 | 7/2010 |
| WO | 2010081821 A1 | 7/2010 |

OTHER PUBLICATIONS

Ash, Handbook of Paper and Pulp Chemicals (2013).*
Gilbert et al., "Mechanism of the Dicyandiamide/Epoxide Reaction," Macromolecules, vol. 24, 360-369 (1991).*
Evonik Industries AG, Evonik for compsites: Products for efficiency and performance, Apr. 1, 2008 (retrieved on Oct. 24, 2012), http://composites.evonik.com/sites/dc/Downloadcenter/Evonik/Product/Composites/Composites_16_03_10_Doppel.pdf.
GB Search and Examination Report for Application No. GB1214876.3, dated Dec. 3, 2012, 8 pages.
GB Search Report for Application No. GB1115168.5, dated Jan. 31, 2012, 9 pages.
GB Search Report for Application No. GB1118194.8, dated Oct. 11, 2012, 3 pages.
Search Report for PCT Application No. PCT/GB2012/052041, dated Nov. 2, 2012, 4 pages.
Walker, Dr. Nigel, NTP Nanotechnology Safety Initiative, National Institure of Environmental Health Sciences, retreived on Dec. 4, 2017, https://www.google.com/url?sa=t&rct=j&q=&esrc=s&source=web&cd=1&cad=rja&uact=8&ved=0ahUKEwjL2LGBkvHXAhVJMd8KHZ9OCZsQFggnMAA&url=https%3A%2F%2Fntp.niehs.nih.gov%2Fntp%2FFactsheets%2FNanoColor06SRCH.pdf&usg=AOvVaw1d8HycAuvDUJMbYfA5B3od.
Guidance for Industry Considering Whether an FDA-Regulated Product Involves the Application of Nanotechnology, retreived on Dec. 4, 2017, https://www.google.com/url?sa=t&rct=j&q=&esrc=s&source=web&cd=6&cad=rja&uact=8&ved=0ahUKEwi88LmakfHXAhUpQt8KHU31BKgQFghMMAU&url=https%3A%2F%2Fwww.chpa.org%2FWorkArea%2FDownloadAsset.aspx%3Fid%3D1351&usg=AOvVaw2GX33SvUkPDOPqhEQShH7i.
Topic guide 11.1: Properties at the nanoscale dimension by Cogent, www.contentextra.com/.../Topic-guide-11.1-Properties-at-the-nanoscale-dimension.pdf.

* cited by examiner

CURABLE MONOMERS

RELATED APPLICATIONS

This application is a national phase application filed under 35 USC § 371 of PCT Application No. PCT/GB2012/052041 with an International filing date of Aug. 21, 2012, which claims priority of GB Patent Applications 1115168.5 filed Sep. 2, 2011 and 1118194.8 filed Oct. 21, 2011. Each of these applications is herein incorporated by reference in their entirety for all purposes.

The invention relates to methods and a novel powdered curable monomer to produce bulk polymers, adhesives, coatings and composite materials with high percentage weight inclusions of particulate filler materials, more specifically to fibre reinforced polymer composite materials with high percentage weight inclusions of particulate filler materials, particularly nano scale fillers.

Thermosetting polymers are, due to their high stiffness, strength, chemical and thermal resistance, the current choice material for the majority of high performance composite materials.

Conventional techniques for preparing fibre reinforced polymer composites (FRPs), involve the use of liquid resins, curing agents, optionally particulate fillers which are mixed and via resin transfer moulding (RTM) or vacuum assisted resin transfer moulding (VARTM) or pre-impregnation (prepreg) processes, and the resin matrix material is infused and encapsulates a fibre reinforcement material. The resultant laminate is then cured.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided a method of preparing a curable monomer adduct powder comprising providing a curable monomer, at least 0.1% wt of a particulate filler, and at least one curing stimulus, comprising the steps of
a) forming a monomer admixture,
b) causing the partial cure of the monomer admixture to a partially cured adduct,
c) reducing the partially cured adduct to an curable monomer adduct powder.

The curable monomer adduct powder, may be used to create bulk polymers, adhesives and coatings composite materials with high percentage weight inclusions of particulate filler materials.

Accordingly there is further provided a method of preparing a fibre reinforced polymer composite comprising the steps of
a), providing a curable monomer, at least 0.1% wt of a particulate filler, at least one curing stimulus and forming a monomer admixture,
b) causing the partial cure of the monomer admixture to a partially cured adduct,
c) reducing the partially cured adduct to an curable monomer adduct powder,
d) providing a fibre reinforcement, coating said fibre with the curable monomer adduct powder,
e) causing the curable monomer adduct powder to cure to a polymer.

The process of mixing and dispersing particulate filler material, such as for example carbon nanotubes (CNTs) within the curable monomer (i.e. a liquid resin) and then transforming said adduct to an curable monomer adduct powder, ensures that the dispersion of the particulate filler in the curable monomer adduct powder is homogeneous and fixed. Conversely, during conventional liquid resin processing the resin/particulate filler solution whilst it is stored in liquid form it is known that, under the action of van der Waals forces, the particles tend to re-agglomerate reducing the quality of dispersion.

The incorporation of the particulate filler material in the partially cured curable monomer adduct powder, ensures that the particulate filler may be evenly dispersed during the final cure, and hence evenly dispersed within the final cured material, such as for example a FRP composite. There is significantly reduced, substantially no, migration of the particulate filler during the final cure to a polymer, as there is no requirement to flow a liquid resin over the fibre reinforcement material.

The powder processing route to prepare FRPs as defined herein allows the ready dispersion of the partially cured curable monomer adduct powder amongst the fibre reinforcement. Therefore it is no longer necessary for traditional liquid moulding processes to be carried out in order to disperse the resin matrix material amongst the reinforcing fibres. These processes include resin transfer moulding (RTM), resin injection, vacuum assisted RTM (VARTM) or resin film formation for the purpose of prepreg production.

Conventional liquid resin processes may be undesirable due to problems in adequately distributing the liquid matrix amongst the fibres, especially where the viscosity of the liquid is sufficiently high to prohibit manufacture using liquid means. The liquid resin viscosity may be prohibitively high when there are high percentage weights (% wt) of particulate fillers, and especially high aspect ratio particulate fillers, particularly nano-sized particulates, at both high and low % wt inclusions. For example, where weight fractions in excess of 0.5% carbon nanotubes (CNTs) are dispersed in a liquid epoxy, the viscosity may be increased to the extent that traditional liquid processing methods are no longer possible.

Additionally, where conventional liquid matrix resins contains nano or micro scale particulate fillers, the composite fibres act to filter the particulates. This results in uneven dispersion of the nano/micro filler particulates within the final composite material.

The curable monomer may be selected from any resin which is used in the field of manufacturing adhesives, coatings, bulk polymers or FRPs, which cure to provide a cross-linked thermoset polymer. Typically the curable monomer is a liquid resin, and may preferably be selected from epoxy resins, polyimides, unsaturated polyesters, vinyl esters, polyurethane, more preferably epoxy resins.

The fibre reinforcement may be any continuous fibre, a wound filament, woven fibre, chopped fibre or at least one ply sheet of material. The fibre reinforcement may be cut or formed into the shape of a component to be manufactured. The fibre reinforcement may be selected from any known fibre reinforcement material, such as, for example, carbon fibre, glass fibre, aramid fibre (Kevlar®), polyethylene fibre (Dyneema®), boron fibre, and SiC fibre.

The particulate filler may be selected from any commonly used particulate filler material, such as, for example, metals, metal alloys, metalloids, inorganic compounds, ceramics and nanoscale carbon particulates, such as, for example, carbon nanotubes, graphite, graphitic fillers, graphene nano-platelets. In a highly preferred embodiment the particulate filler is a high aspect ratio particulate filler, more preferably a nanoscale particulate, yet more preferably a nanoscale carbon particulate, such as, for example carbon nanotubes or graphene platelets.

The particulate filler may be present in amount greater than 0.1% wt, preferably 0.5% wt, preferably greater than 1% wt, more preferably greater than 5% wt, even more preferably greater that 10% wt, preferably in the range of from 10% wt to 40% wt. Preferably the average longest dimension of the filler particulate is less than 500 microns, more preferably less than 50 microns, yet more preferably sub micron, more preferably nanoscale particulates. In a highly preferred arrangement the particulate filler is selected from high aspect ratio particulate fillers, such as, for example carbon nanotubes, which may possess average longest dimension of less than 20 microns and typically have a diameter of less than 20 nanometers.

At higher inclusion weight percentages the particulate fillers provide enhanced physical and mechanical properties on the FRPs, adhesives, coatings, or products made from the curable monomer adduct powder. The use of CNTs as particulate fillers provides enhanced stiffness, strength, toughness, fatigue strength, properties, preventing the promulgation of cracks. They can also enhance electrical conductance, improve wear and also provide fire resistance properties. Furthermore CNTs, when presented at greater than 10% may provide significant thermal conductive properties.

The curing stimulus may be any chemical curing agent or irradiative means to cause a curing reaction, such as, for example chemical hardeners, UV, IR, electron beam and heat. Preferably the initial cure to cause the partially cured adduct may be provided by a chemical hardener.

As described earlier for carbon nanotubes where weight fractions in excess of 0.5% wt are dispersed in a liquid epoxy, the viscosity may be increased to the extent that traditional liquid processing methods for FRPs are no longer effective. In the method of the current invention the particulate filler is mixed with the curable monomer (resin) and the curing stimulus to form a monomer admixture. The monomer admixture may be formed with any weight fraction (% wt) of particulate filler, because the admixture is not subjected to traditional liquid processing methods. The monomer admixture is merely transferred into a mould and partially cured to a partially cured adduct. Whereas in RTM or other liquid resin moulding methods, the methods are unable to process liquid resins with exceptionally high viscosities.

The method defined herein allows the individual particulates of the particulate filler to be "wetted", during the formation of the monomer admixture. The effective dispersion of nano particulates in the curable monomer may require the use of high shear forces to achieve fine homogenous dispersions. This may be attained by use of ultrasonication, triple roll milling or high forced turbo mixing methods. The monomer admixture is then partially cured, thereby fixing the dispersion.

If the particulate filler were only dry mixed with a powdered partially cured resin (i.e. no formation of a monomer admixture and causing an adduct) then the particulates of the particulate filler may form agglomerates. Therefore, when the mixture is subjected to the final cure stage, it may provide a non-homogeneous dispersion of filler particulates in the final polymer. The method according to the invention provides a means of providing homogeneous dispersion of high aspect ratio and/or high % wt inclusion particulate fillers in a cured structure such as, for example an FRP, coatings, adhesives, or bulk polymers.

The partial curing reaction to the partially cured adduct may be controlled by removing the curing stimulus, such as for example by removing the heat source, stopping any irradiative stimulus and removing any supported curing agents. Typically the partially cured adduct may be furnished by cooling the reaction to a temperature such that the polymerisation (i.e. curing) reaction cannot be sustained. Typically curing reactions for liquid resins are undertaken at elevated temperatures i.e. 50° C. or higher, in order to achieve rapid curing within a reasonable timescale for industrial processes. In a highly preferred arrangement the monomer admixture is caused to cure at a temperature below 50° C., preferably at substantially room temperature conditions or lower, such that a full cure is not achievable. The exact temperature and duration may be selected such that only the partially cured adduct is produced.

The physical reduction of the partially cured adduct to a powder may be undertaken by any physical means, typically mechanical means, such conventional processing means are, such as, for example pulverising, milling, grinding, rolling etc. In a highly preferred arrangement the mechanical reduction is performed at a controlled temperature, particularly reduced temperatures, such as cryogenic milling, so as to reduce or remove the heat evolved during the mechanical processing, which may cause the curing reaction to recommence. It may be desirable to add further particulate filler materials to the partially cured curable monomer adduct powder, and mechanically mix them together prior to the final curing stage.

The partial curing reaction is effectively stopped before 100% cross linking is achieved, preferably less than 90%, preferably less than 70%. The use of cryogenic milling has been shown to provide a 70% cured adduct, as confirmed by DSC measurements.

Resin cure per se describes the chemical formation of three dimensional crosslinked chains. The level of crosslinking, the crosslink density, is time dependent and as the reaction progresses and the number of links increases molecular mobility is reduced.

Gelation and vitrification are the two clear stages of the cure process. Gelation occurs when the reaction products form a 3D network and vitrification occurs when the liquid or rubbery reacting mixture transforms to the glassy state. Monitoring of the state of cure may be achieved using a number of methods including: Differential Scanning Caliometry (DSC), Dynamic Mechanical Thermal Analysis (DMTA) and Fourier Transform Infrared spectroscopy (FTIR). The cure for the partially cured adduct, is permitted to continue until solidification, and is then suspended before complete cure, typically a 3D crosslink network formation is complete.

The partially cured adduct (containing the particulate filler) may be isolated and stored as an intermediate product. Conventional liquid resin technology has developed the use of pre-pregs, which are fibre reinforcement sheets which are pre-impregnated with a resin and curing agent, typically they may be stored at reduced temperatures to stop the curing reaction. They may then be used to stack in a laminate without the need for additional resin.

According to a further aspect of the invention there is provided a curable monomer adduct powder, comprising a partially cured curable monomer, a curing agent, and at least 0.1 wt % of a particulate filler with an average longest dimension of less than 500 microns.

The curable monomer adduct powder may be used to produce fibre reinforced polymer composites, adhesives, coatings, or be used as the curable material in additive layer manufacture.

According to a yet further aspect of the invention there is provided a curable monomer adduct powder comprising a partially cured curable monomer admixture comprising, a curing agent, and greater than 0.5% wt of a carbon nanotube particulate filler.

The particulate filler may be present in amount greater than 0.5% wt, more preferably greater than 1% wt, more preferably greater than 5% wt, even more preferably greater that 10% wt, yet more preferably in the range of from 10% wt to 40% wt.

Prior to the final cure step in providing a FRP, there may be further additives, fillers, sensors, wires, reinforcement means that are added to the laminate to provide further functionality.

The final cure, namely causing the curable monomer adduct powder to be fully cured to a 3D cross-linked state namely the final polymer, may be caused by the application of a further curing stimulus, typically one which is selected from the curing stimuli as hereinbefore defined, and/or by the addition of a curing catalyst. It may be desirable that the further curing stimulus for the final cure is different from the curing stimulus that causes the partial cure to the curable monomer adduct powder. The exact conditions for achieving a partial cure and full cure to the final polymer will be clearly defined by the initial selection of the curable monomer.

The curable monomer adduct powder may be transferred into a mould, typically under the action of heat to cause the curing reaction to be resumed. The curable monomer adduct powder particles merge and molecular crosslinking is resumed, preferably the mould will comprise a fibre reinforcement. In some instances applied pressure or a vacuum, may also be necessary to reduce porosity. At the termination of cure, a bulk thermosetting polymer solid is formed that includes dispersed particulate filler.

The curable monomer adduct powder may be distributed evenly over the surface of fibre reinforcement materials (ply(s)), or used as an adhesive, coating or bulk polymer. The composite may then be cured using conventional means, such as, for example an oven, autoclave, UV light, and optionally under vacuum. During this process the powdered material reverts to a high viscosity liquid or a highly malleable solid, retaining sufficient mobility to impregnate the fibrous reinforcement.

According to a further aspect of the invention there is provided a fibre reinforced polymer composite, comprising a cured thermoset polymer, at least one ply of a fibre material therein, and at least 1% wt of a particulate filler with an average longest dimension of less than 500 microns.

According to a further aspect of the invention there is provided a fibre reinforced polymer composite, comprising a cured thermoset polymer, at least one ply of a fibre material therein, and at least 1% wt of a carbon nanotube particulate filler or graphene platelets.

The particulate filler may be present in amount greater than 0.5% wt, more preferably greater than 1% wt, more preferably greater than 5% wt, even more preferably greater that 10% wt, yet more preferably in the range of from 10% wt to 40% wt.

The curable monomer adduct powder may be used as an adhesive and applied between two prepared surfaces, heat, optionally raised or reduced pressure and optionally a further curing stimulus to cause the materials to become bonded by the adhesive.

The curable monomer adduct powder may be applied to a surface by a powder coating process, the curable monomer adduct powder may then be cured to provide a coating.

The curable monomer adduct powder may be used in an additive layer process. The ALM process steps may be to cure a first layer of curable monomer adduct powder, such as, for example in the range of 0.1 mm to 2 mm thick, using a directed EM device, such as, for example a laser, IR or UV source. A second layer of curable monomer adduct powder may then be applied over the surface of the irradiated first layer of cured powder, wherein the focal length of the beam is maintained either by adjusting the position of the second layer curable monomer adduct powder bed or the lens of the EM device. This second layer, due to the good adhesive properties of thermoset polymers, adheres to the surface of the first layer under the EM cure. During conventional thermoplastic or metallic ALM methods, interlayers are typically mixed by simultaneous melting and fusion.

According to a further aspect of the invention there is provided a method of forming a 3 dimensional object comprising the steps of using an additive layer process comprising the use of a curable monomer adduct powder, and optionally causing a post cure to the final product.

An additive layer process allows the deposition of layers of material with different percentage weight inclusions of particulate filler. Thereby allowing articles to be produced with gradients or regions of said article with different physical characteristics.

In an alternative process the curable monomer adduct powder may be deposited via a nozzle into the focused region of the EM radiation source. This removes the requirement of large powder beds.

In a preferred arrangement, after the formation of the final product, a post cure process may be applied to the final product. The post cure step may increase the bulk thermal and elastic properties of the final product. The post cure process additionally supplements the adhesive interlayer bond with molecular crosslinking. The parameters of the post cure must be carefully selected to provide enhancements for: in-service temperatures, in-service loading, etc.

The use of the post cure establishes cross linking between deposited layers. As this is a thermoset, there is no melting and fusion between layers in the ALM construction, and before post cure the layers are held together by adhesion.

In an ALM process, the effectiveness of EM source is influenced by the particle size of the particulate filler its radiation absorption characteristics and therefore the degree of heating initiated by the cure source.

An embodiment of the invention will now be described by way of example only and with reference to the accompanying drawings of which:

Figure 1:
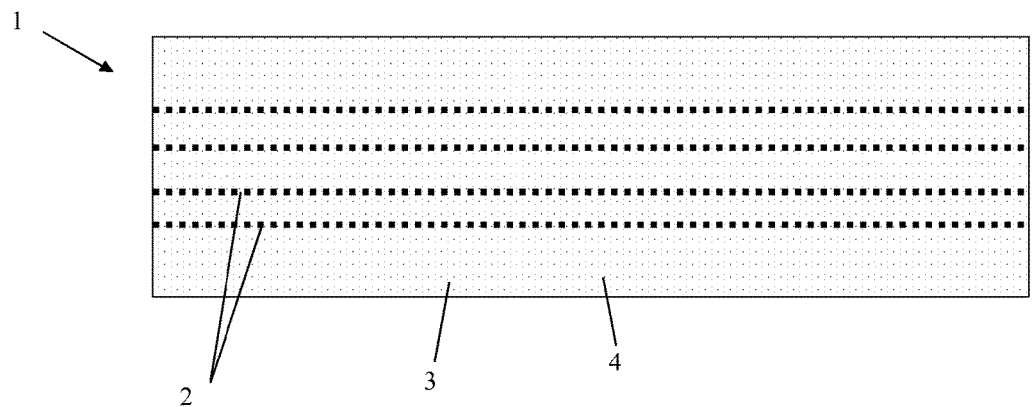
FIG. 1 shows a side view of a fibre reinforced composite material

Turning to FIG. 1, provides a fibre reinforced composite material 1, comprising reinforcement fibre plys 2, which are encapsulated in a resin matrix 3, which said resin matrix further comprises particulate filler materials 4.

Figure 2:
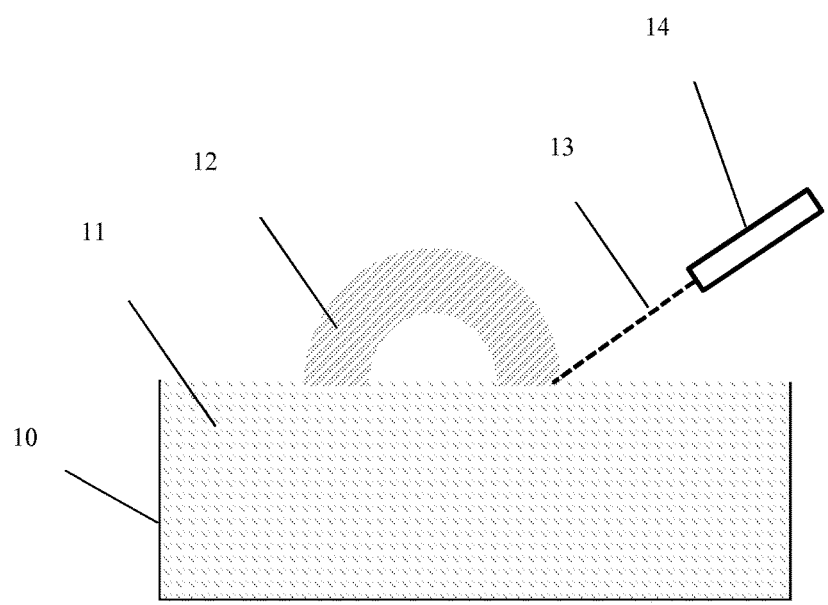
FIG. 2 shows an ALM process

Turning to FIG. 2 there is provided a container 10 holding curable monomer adduct powder 11, which is cured by a laser 14, when the laser beam 13, impinges on the surface of the powder 11. The container 10 may be lowered after each successive surface layer has been created to reveal the cured 3 dimensional product 12

EXPERIMENT 1

Curable Monomer Adduct Powder

Liquid epoxy resin (e.g. Huntsman LY564) (74 g) was mixed with 2 g carbon nanotubes (Nanocyl NC7000). The CNTs were dispersed in the resin to separate out the agglomerations. This dispersion was performed by a triple roller mill to subject the solution to high shear forces, however ultrasonic mixing methods are equally applicable.

The epoxy-CNT (2.7 pph) solution was combined with a stoichiometric quantity of liquid curing agent 35 g (Huntsman Aradur 2954) and mixed. The solution was poured into a mould and left to cure at room temperature for 24 hours. The mould housing was temperature controlled to prevent exothermic reactions accelerating the rate of cure, beyond the partially cured adduct.

The powdered adduct had advanced the cure sufficiently for the epoxy to be solid without achieving complete 3D network formation. The solid adduct was crushed to a coarse aggregate and milled to a fine powder at cryogenic temperatures. The cryomill ensured that the milling process did not generate heat, which may have reactivated the curing process.

EXPERIMENT 2

Formation of a FRP

The powdered adduct from Experiment 1 was then dispersed evenly over the surface of 6 plys of woven 300 $g.m^{-2}$ carbon fabric in a stacked laminate. The quantity applied to each ply was controlled to ensure the correct fibre volume fraction of the completed composite laminate that is for a 55% volume fraction, approximately 170$g.m^{-2}$ of powdered resin evenly distributed over each ply.

The laminate was placed under vacuum and cured at 120° C. under high pressure (6 bar) in an autoclave, for 30 minutes, with a heating ramp rate of 10° $C.min^{-1}$. During cure the curable monomer adduct powder reverted to a mobile state so that good wetting of the carbon fabric was achieved.

EXPERIMENT 3

Interlaminar Toughness

Fracture resistance to interlaminar crack propagation is a key measure of toughness and damage tolerance for composite laminates. A 5 wt % formulation of NC7000 CNT in LY564/ARADUR2954 was applied to a carbon fibre laminate as in Experiment 2. The nano-augmented laminates were compared against control laminates using the same unmodified epoxy resin. Interlaminar fracture energies were measured using Double Cantilever Beam tests (ASTM D5528). The mean propagation fracture energy of the nano-augmented laminate increased from 329 $J/m^2$ to 486 $J/m^2$ (47%), reflecting the enhanced energy dissipation caused by the presence of CNT at a concentration level not previously achievable with conventional liquid techniques of incorporating CNT. The improved fracture resistance is accompanied by concomitant enhancements in glass transition temperature and elastic modulus. The inclusion of at least 5% wt of a carbon nanoscale particular filler in the matrix, allow the matrix to become electrically conducting. This enables the development of multi-functional structural laminates, such as, for example integrated protection against electromagnetic hazards.

EXPERIMENT 4

ALM Process

The powdered adduct from experiment 1 was used in an ALM process.

The cure was provided by using a 600 W laser, with a spot size of approximately 20 mm diameter, The beam was scanned at a rate of 15 mm/sec over a 1.5 mm depth of curable monomer adduct powder, which showed transformation of the curable monomer adduct powder to a bulk solid. It was found that increasing the energy density had the effect of thermally degrading the powder.

The invention claimed is:

1. A method of preparing a curable resin adduct powder, comprising:
   providing a curable liquid resin;
   providing at least 5% wt of a nano-scale filler;
   providing at least one curing stimulus;
   forming an admixture consisting of said curable liquid resin and said nano-scale filler;
   applying the at least one curing stimulus to the liquid resin admixture, thereby initiating a curing reaction of said liquid resin admixture, wherein said liquid resin admixture, upon initiation of said curing reaction, consists of said curable liquid resin, said nano-scale filler, and any chemical curing agents included in said at least one curing stimulus, the curing action being performed at a controlled temperature less than 50° C.;
   stopping the curing reaction before it has completed, thereby causing a partial cure of the liquid resin admixture and forming a partially cured adduct; and
   reducing the partially cured adduct to a curable resin adduct powder.

2. A method of preparing a fibre reinforced polymer composite, comprising:
   providing a fibre reinforcement;
   coating said fibre reinforcement with the curable resin adduct powder of claim 1; and
   causing the curable resin adduct powder to cure to a polymer.

3. The method according to claim 2, wherein the curable resin adduct powder is caused to cure to a polymer by exposure to at least one further curing stimulus.

4. The method according to claim 3, wherein the at least one further curing stimulus is selected from one or more of heat, UV, IR, electron beam, a further chemical curing agent, or a catalyst.

5. The method according to claim 1, wherein the nano-scale filler is a nano scale carbon particulate.

6. The method according to claim 1, wherein the step of reducing the partially cured adduct to a curable resin adduct powder is by mechanical reduction and is carried out under controlled temperature conditions.

7. The method according to claim 1, wherein the curing stimulus is heat, and the curing reaction is stopped by cooling the partially cured adduct.

8. The method according to claim 1, wherein the nano-scale filler is present in an amount greater than 10% wt.

9. A method of forming a 3 dimensional object comprising forming the 3 dimensional object by an additive layer process that uses the curable resin adduct powder of claim 1.

10. The method according to claim 9, wherein the particulate filler is selected from a carbon nanotube or graphene particulate.

11. The method according to claim 1, wherein the step of reducing the partially cured adduct to a curable resin adduct powder is by cryogenic milling.

12. The method according to claim 1, wherein the nano-scale filler is present in the range of from 10 to 40% wt.

13. The method according to claim 1 wherein reducing the partially cured adduct includes mechanical reduction of the partially cured adduct by at least one of pulverizing, milling, grinding, and rolling.

14. The method according to claim 1, further comprising causing the curable monomer adduct powder to cure to a polymer by exposure to at least one further curing stimulus.

15. The method according to claim 14, wherein the at least one further curing stimulus is selected from one or more of heat, UV, IR, electron beam, a further chemical curing agent, or a catalyst.

* * * * *